Sept. 3, 1968          R. C. BRADLEY          3,399,834

APPARATUS AND METHOD FOR FORMING PLASTIC ARTICLES

Filed Feb. 17, 1964          5 Sheets-Sheet 1

INVENTOR.
RICHARD C. BRADLEY

BY *Rommel, Alexius & Rommel*

ATTORNEYS

Sept. 3, 1968  R. C. BRADLEY  3,399,834
APPARATUS AND METHOD FOR FORMING PLASTIC ARTICLES
Filed Feb. 17, 1964  5 Sheets-Sheet 2

INVENTOR
RICHARD C. BRADLEY
BY Rommel, Alwini and Rommel
ATTORNEYS

Sept. 3, 1968  R. C. BRADLEY  3,399,834
APPARATUS AND METHOD FOR FORMING PLASTIC ARTICLES
Filed Feb. 17, 1964  5 Sheets-Sheet 3

INVENTOR
RICHARD C. BRADLEY
BY *Rommel, Alarni and Rommel*
ATTORNEYS

Sept. 3, 1968 R. C. BRADLEY 3,399,834
APPARATUS AND METHOD FOR FORMING PLASTIC ARTICLES
Filed Feb. 17, 1964 5 Sheets-Sheet 4

INVENTOR
RICHARD C. BRADLEY

BY Rommel, Alleine and Rommel

ATTORNEYS

Sept. 3, 1968 R. C. BRADLEY 3,399,834
APPARATUS AND METHOD FOR FORMING PLASTIC ARTICLES
Filed Feb. 17, 1964 5 Sheets-Sheet 5

INVENTOR
RICHARD C. BRADLEY
BY *Rommel, Alwin & Rommel*
ATTORNEYS

United States Patent Office 3,399,834
Patented Sept. 3, 1968

3,399,834
APPARATUS AND METHOD FOR FORMING
PLASTIC ARTICLES
Richard C. Bradley, % Plastic Engineering and Chemical
Co., 3501 NW. 9th Ave., Fort Lauderdale, Fla. 33309
Filed Feb. 17, 1964, Ser. No. 345,376
3 Claims. (Cl. 239—10)

This invention relates to improvements in apparatus and methods for forming plastic articles.

Present day molding, fabricating coating, and other techniques of working with plastic require the use of a plurality of chemical components in order to secure a suitable end product. For instance, in working with polyester resins, a blend of polyester resin, catalyst, and promoter must be provided in order to attain an end product that is properly cured or hardened and which will cure or harden in a reasonable length of time.

Previously provided spray guns for the spray depositing of plastics have included no more than two spray heads, which meant that the component chemical elements had to be mixed together long prior to the time that they were applied to the mold or other final location. In the case of polyester resins, for instance, polyester resin and catalyst were mixed together in one container, usually referred to as a "pot," and supplied to one head of the spray gun, this being known as the "catalyst side" of the spray gun; and polyester resin and promoter were mixed together in a separate "pot" and supplied to the other head of the spray gun, this being known as the "promoted side" of the spray gun.

Such spray techniques caused many problems, not the least of which was that the mixture of resin and catalyst or promoter reacted in such a manner as to cause the plastic to harden in the "pot," some mixtures having a "pot life" of as short as one hour.

It is therefore a primary object of my invention to provide apparatus and methods whereby to avoid the problems of such previously practiced spray techniques.

I have discovered that the mixture of resin and some promoters have a relatively long "pot life," whereas the mixture of resin and catalyst has a relatively short "pot life." It is therefore a further object to provide apparatus and methods for blending a mixture of plastic resin and promoter with a catalyst by projecting a spray of catalyst into a spray of the mixture of plastic resin and promoter in the spray depositing of plastics at a given location.

Inasmuch as a very small quantity of catalyst is used in proportion to the resin and promoter, certain problems, such as spray directional aiming and saturation of the promoted resin spray with catalyst were encountered. It is therefore a further object of my invention to provide apparatus and methods whereby to secure optimum directional aiming of spray techniques and optimum intermixing of catalyst and promoted resin.

Since in my invention, the catalyst is not "premixed" with the resin, and inasmuch as a proper supply of catalyst must be maintained in order to provide for optimum hardening or curing of the resin, it is obvious that some means must be provided so that the operator can ascertain that the catalyst is flowing properly. A further object of my invention is thus the provision of an improved sight flow gauge whereby to ascertain the proper flow of catalyst.

Inasmuch as the catalyst itself is extremely thin, and the cost thereof is considerable, a shut-off valve for the same must be provided which does not leak. A further object of my invention is thus the provision of an improved valve.

Other objects and advantages of the invention will be apparent during the course of the following detailed description, taken in connection with the accompanying drawings, forming a portion of this specification, and in which drawings.

Figures 9, 11:
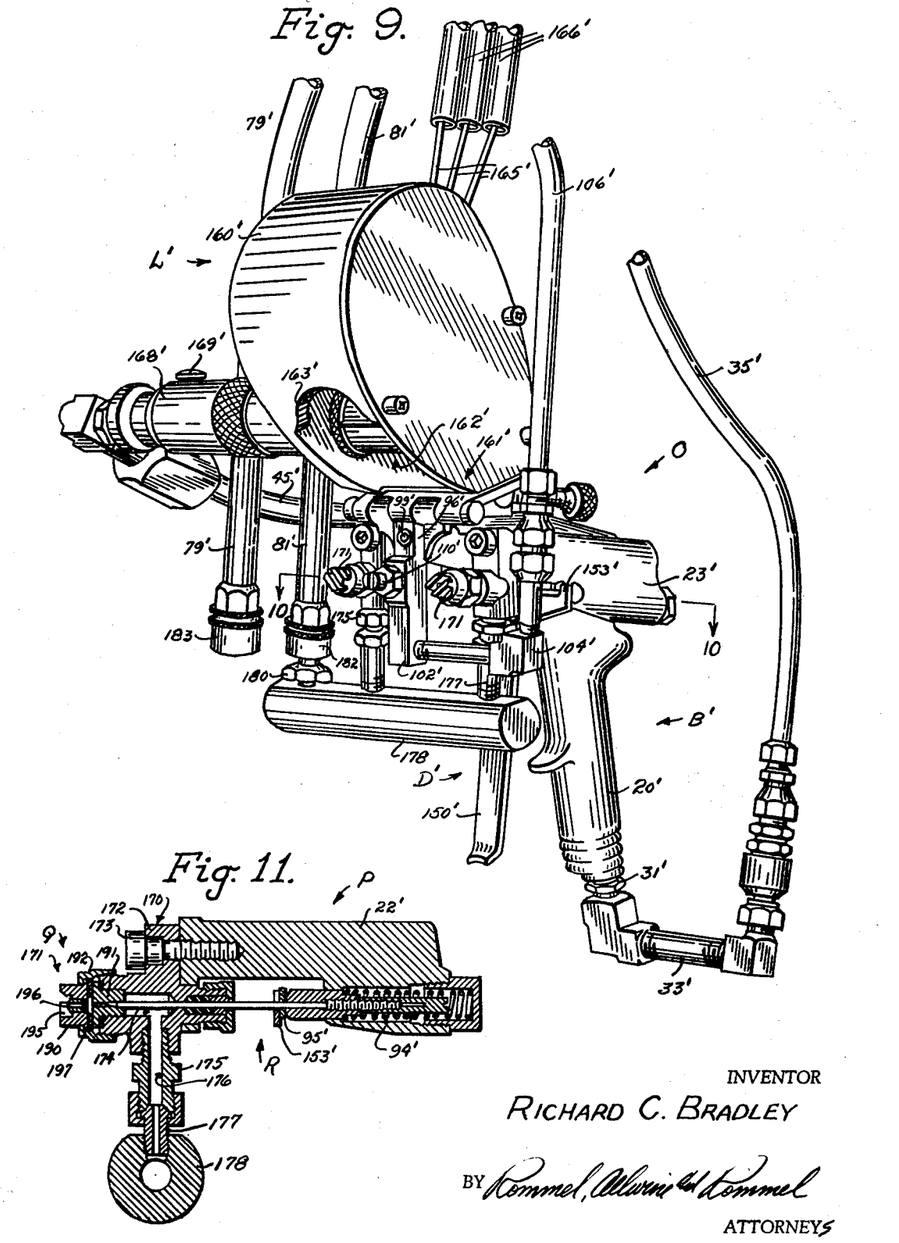
FIG. 9 is a perspective view showing a modification of my improved apparatus.
FIG. 11 is a sectional view taken substantially on the line 11—11 of FIG. 10.
Figure 10:
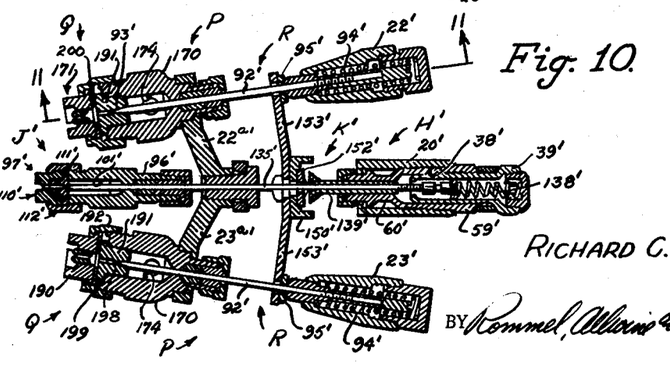
FIG. 10 is a sectional view taken substantially on the line 10—10 of FIG. 9.

In the drawings, wherein for the purpose of illustration are shown preferred and modified embodiments of the invention, and wherein similar reference characters designate corresponding parts throughout the several views, the letter A may generally designate a spray gun which may include a main body portion B, valve means C of the main body portion, trigger means D, outboard spray means E having nozzle means F and fluid flow control means G, central spray means H having nozzle means J and fluid flow control means K, and cutter means L which may be optionally provided for furnishing an aggregate or fiber reinforcements to the synthetic resin spray; and O the modified spray gun means as shown in FIG. 9, having modified outboard spray means P including nozzle means Q and fluid flow control means R.

The main body portion B of spray gun A preferably includes a handle portion 20, a central barrel portion 21 extendant from handle portion 20, and side barrel portions 22 and 23. One side barrel 22 is attached to one side of central barrel portion 21, and the other side barrel portion 23 is attached to the other side of central barrel portion 21.

Handle portion 20 is provided with passageways 24 and 25 extending longitudinally therethrough. Each of the passageways 24 and 25 open at one end thereof into chamber 27, within which chamber 27 is received valve means C, which will be subsequently described. Passageway 25 is provided at the opposite end thereof from chamber 27 with a plug 29, and passageway 24 is provided at the opposite end thereof from chamber 27 with a hose connection 31. Suitable connecting means 33 may be secured to hose connection 31, for attachment of a hose 35 thereto. The hose 35 interconnected to an air supply, for a purpose as will be subsequently described.

A chamber 38, opening into chamber 27, is provided in handle portion 20, to the opposite side of chamber 27 from the passageways 24 and 25. Means 39 for reciprocably supporting fluid flow control means K of central spray means H is mounted within chamber 38, as will be subsequently described.

Barrel portion 21 is provided with an elongated passageway 40 therethrough, extendant from handle 20, which chamber 40 has an opening 41 leading to chamber 38. The end of chamber 40 adjacent handle 20 is provided with a threaded sleeve 42 to which is secured a coupling 43 which supports a conduit 44 leading to hose 45.

Hose 45 is interconnected to cutter means L, as will be subsequently described.

Valve means C preferably includes a housing 50 secured within chamber 27, which housing 50 slidably receives and supports a shaft 51. One end of shaft 51 extends exteriorly of housing 50, in juxtaposition for abutment against trigger means D, and the opposite end thereof is provided with a plunger 52. A spring 53 is mounted within chamber 27 and abuts against plunger 52, urging shaft 51 into abutment with trigger means D.

Figures 1, 4:
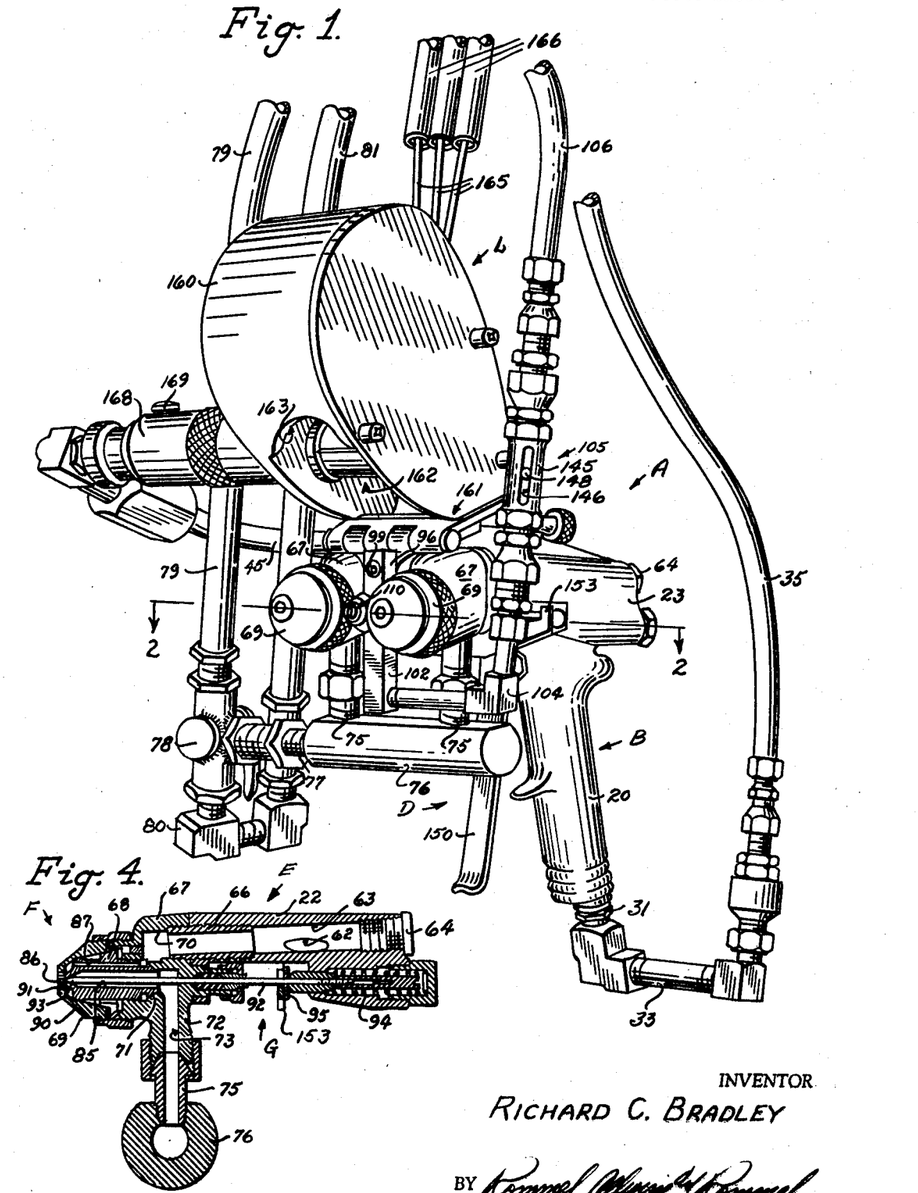
FIG. 1 is a perspective view of my improved apparatus.
FIG. 4 is a sectional view taken substantially on the line 4—4 of FIG. 2.
Figure 2:
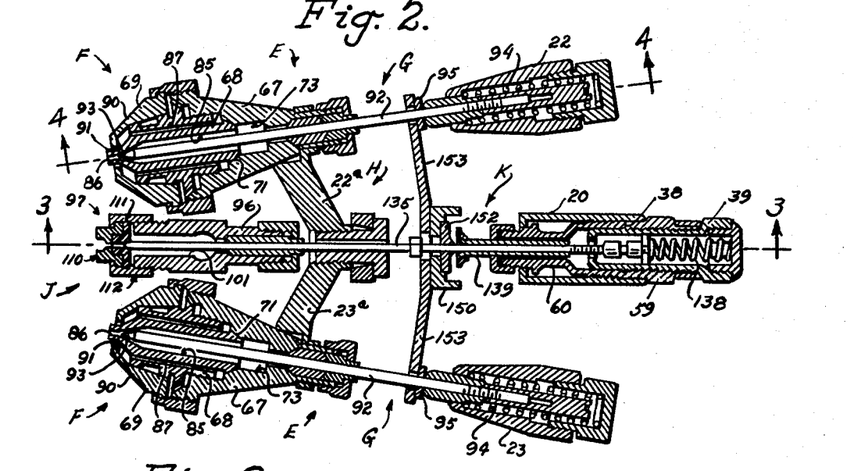
FIG. 2 is an enlarged sectional view taken substantially on the line 2—2 of FIG. 1.
Figures 3, 12:
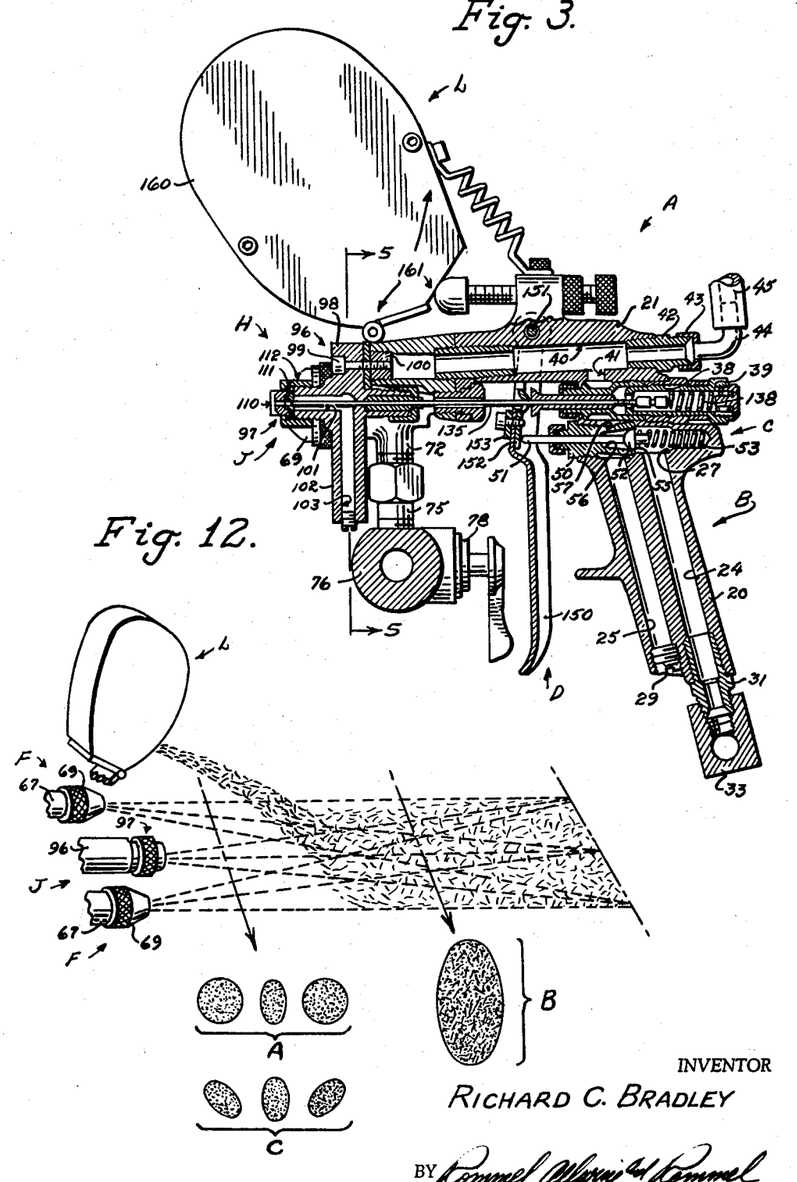
FIG. 3 is a sectional view taken substantially on the line 3—3 of FIG. 2.
FIG. 12 is a diagrammatic view showing the spray pattern of my improved apparatus.
Figure 5:
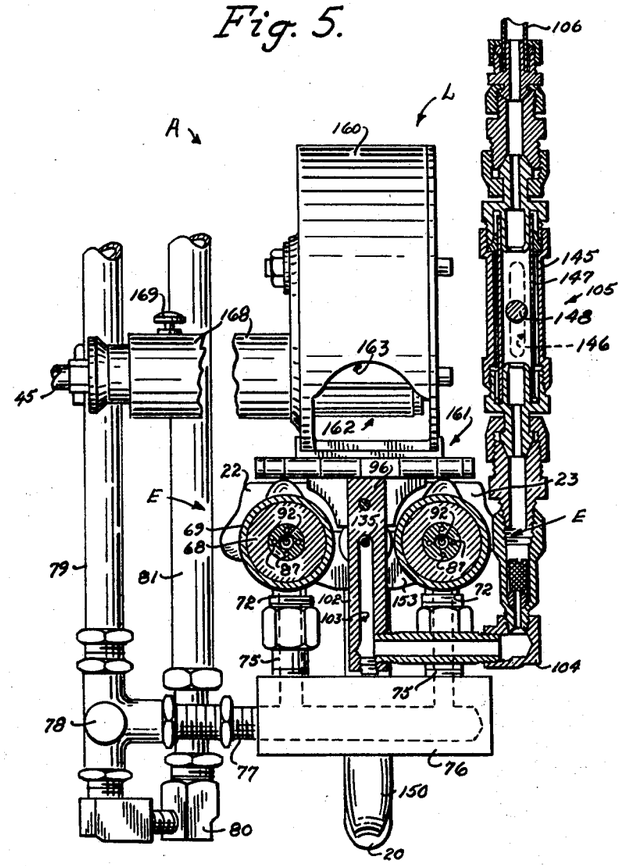
FIG. 5 is a sectional view taken substantially on the line 5—5 of FIG. 3.

Housing 50 is provided with a mouth 55, positioned for opening and closing thereof by the plunger 52. The mouth 55 opens into passageway 24 and leads to a chamber 56 within housing 50. The chamber 56 is provided with a plurality of outlets 57, which outlets 57 open into chamber 38. Housing 50 therefore serves to divide the chamber 27 into two parts, one portion of which interconnects with passageway 24, and the other portion of which opens into chamber 38. When plunger 52 is seated in the mouth 55 of housing 50, as shown in FIG. 3, air under pressure in passageway 24 is prevented from being introduced through housing 50 and into chamber 38, and when the plunger 52 is unseated from the opening 55, direct communication of the air from passageway 24 into the chamber 38 is permitted, through openings 57 of the housing 50.

Support means 39 includes a main body portion 59 having a portion 60 of reduced diameter, which portion 60 permits air flow from outlets 57, about the reduced portion 60, through opening 41 and into passageway 40.

A pair of outboard spray means E are provided, one mounted on each of the side barrel portions 22 and 23. The spray means E of side barrel portions 22 and 23 are angled convergently toward one another at the nozzle end thereof to provide a "crossfire" spray pattern as shown in FIG. 12. It is to be noted that front brace members 22ª and 23ª are provided respectively as a part of side barrel portions 22 and 23 for directly supporting the nozzle means F thereof.

These outboard spray means E are identical, as are the nozzle means F and fluid flow control means G thereof, and identical reference characters have therefore been applied to each.

Each side barrel portion 22 and 23 is provided with a passageway 62 which opens, at one end thereof, into chamber 40 of central barrel portion 21, and opens, at the other end thereof, into chamber 63 of the side barrel portions 22 and 23. Chamber 63 opens, at one end thereof, into nozzle means F of spray means E, and a plug 64 is provided at the opposite end of each chamber 63. Threaded conduit 66 is secured within chamber 63, for interconnection thereto of nozzle means F, as will be subsequently described.

Each nozzle means F includes a housing 67, fluid nozzle portion 68 and air nozzle portion 69.

Housing 67 includes a passageway 70 interconnected with chamber 63 by conduit 66, a chamfered valve seat 71, which cooperates with fluid nozzle portion 68, as will be subsequently described, and a conduit 72 having a passageway 73 therethrough, which passageway 73 opens at one end thereof into valve seat 71.

Couplings 75 may be attached to the conduits 72 of each outboard spray means E, which couplings 75 are attached to a manifold assembly 76. Manifold 76 is provided with an outlet 77 leading to a three-way valve member 78. A hose 79 is attached to and opens into valve member 78, and a conduit 80 to which is attached a hose 81 is likewise attached to and opens into valve member 78. Inasmuch as different plastic compositions may be desired to be sprayed through spray means E, a connection for handling dual hoses is provided. For instance, in the spray depositing of polyester resins, it may be desirable to supply a promoted resin through, for instance, hose 79, and thereafter, after the plastic article has been formed, to provide an exterior coating of a different plastic, which may, for instance, be carried through hose 81. In such a case, the valve member 78 would be manipulated so that the promoted resin would be fed to manifold 76 from hose 79, and after this procedure has been completed, valve 78 would be manipulated so that flow from hose 81 was fed into manifold 76. The particular interconnection of hoses to manifold 76 does not form any predominant part of my invention, for it is to be understood that, instead of using the valve member 78, "quick disconnect" couplings could be provided so that a plurality of hoses could be attached, one at a time, to manifold 76. It is likewise obvious that any form of valve member 78 for receiving any number of hoses could be provided, and the present invention is not limited to merely a two hose connection.

The fluid nozzle portion 68 of each nozzle means F is seated within a valve seat 71 and has a passageway 85 which opens at one end thereof into passageway 73 and is tapered at the other end thereof to provide a restricted outlet portion 86.

Each fluid nozzle portion 68 is provided with a plurality of passageways 87 peripherally about and spaced from the passageway 85. The passageways 87 interconnect and open at one end thereof into passageway 70. The opposite end of the passageways 87 open adjacent the air nozzle portion 69.

When the spray gun is held in a horizontal position, as shown in FIG. 3, the outlet portions 86 of each outboard spray means E will be in the same horizontal plane. Since the outboard spray means E are mounted in a fixed position upon the spray gun, it is obvious that the axes of the spray issuing from one nozzle means F will always be in the same plane as the axis of the spray issuing from the other nozzle means F.

Air nozzle portion 69 is secured to housing 67 and includes a tapered wall portion 90 which is convergent toward the restricted outlet portion 86 and is provided, adjacent the restricted outlet portion 86, with an opening 91.

Fluid flow control means G controls the expulsion of fluid through the passageway 85 and the restricted outlet portion 86 of spray means E. Fluid flow control means G preferably includes a shaft 92 slidably received within and supported by housing 67, shaft 92 extending through passageway 85 and terminating with a needle-like pointed portion 93 which slidably interfits within the restricted outlet portion 86.

The opposite end of shaft 92 from the needle-like portion 93 is slidably mounted within the side barrel portion adjacent thereto, and is urged, as by spring 94, forward and into the restricted outlet portion 86. A guide washer 95 is secured to shaft 92, which guide washer 95 is provided for abutment against trigger means D, as will be subsequently described.

Central spray means H is mounted on central barrel portion 21, preferably in juxtaposition so that the spray pattern axis of spray issuing from nozzle means J is in the same plane as the axes of sprays issuing from spray means E. The spray of central spray means H intersects the sprays of spray means E in a manner to be trapped in the "crossfire" of sprays issuing from spray means E.

Nozzle means J of central spray means H may be of the same type as above described with respect to nozzle means F of spray means E. However, nozzle means F above described requires the use of compressed air in atomizing the fluid discharged therefrom. Central spray means H is provided, as will be subsequently described, to carry the catalyst component of the plastic resin to be spray deposited. Such catalyst is extremely expensive and excessive fumes therefrom will cause irritation to the operator's eyes and respiratory system. In the event that compressed air jets were used for atomizing the spray of the catalyst carrying central spray means H, there would be an overspray of catalyst, causing a wastage thereof, and air assisted atomization would cause wide and excessive dissemination of the catalyst fumes. I therefore preferably use, as a nozzle means J of the central spray means H, what is known as an "airless" type fluid nozzle. This nozzle is designed to provide a finely divided spray without excessive wastage or dissemination of fumes, even when fluid pressure is as low as 30 p.s.i.

Figure 6:
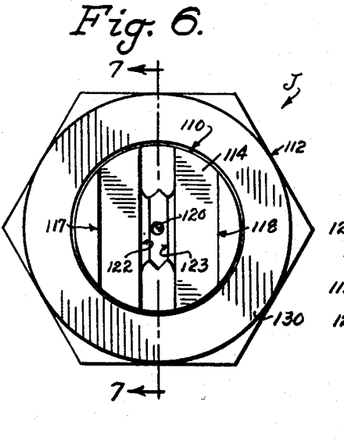
FIG. 6 is an enlarged front elevation of my improved nozzle.
Figure 7:
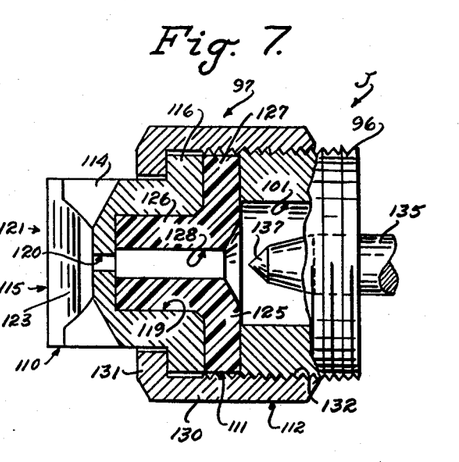
FIG. 7 is a sectional view taken substantially on the line 7—7 of FIG. 6.
Figure 8:
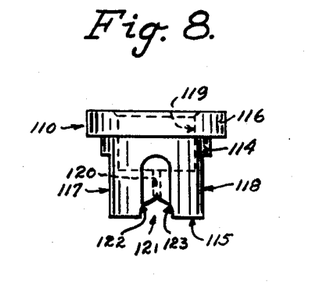
FIG. 8 is an enlarged side elevation of the interior portion of the nozzle of FIGS. 6 and 7.

A conventional "airless" type of fluid nozzle may be utilized, however, I preferably utilize my improved "airless" type fluid nozzle, as shown in FIGS. 6, 7 and 8. My improved "airless" nozzle provides for quick, efficient, and complete cut-off of fluid through the nozzle, which is important in expensive and thin fluids, such as catalysts.

Nozzle means J therefore preferably includes a housing 96 and my improved nozzle valve means 97.

Housing 96 preferably includes an upper flanged portion 98 which is secured, such as by screw member 99, to a plug 100 threaded into passageway 40 of central barrel portion 21. The housing 96 is thus supported upon the spray gun A. Housing 96 likewise includes a passageway 101 leading to valve member 97, and a conduit portion 102 having a passageway 103 which opens at one end thereof into passageway 101. Conduit 102 is attached, at the end thereof opposite its opening into passageway 101, with a conduit 104 which leads through sight gauge means 105, to a hose 106. Sight gauge means 105 will be subsequently described.

My improved nozzle valve means 97 preferably includes a tip 110, seat 111, and retainer nut 112.

Tip 110 preferably includes a main body portion 114 having a discharge end 115; a flange portion 116 at the opposite end thereof from the discharge end 115; exterior flattened tool receiving faces 117 and 118; a chamber 119; which receives seat 111, as will be subsequently described; and a discharge orifice 120 which leads from chamber 119 to the discharge end 115 thereof.

Discharge end 115 of tip 110 is provided with a substantially V-shaped cut 121 having opposed faces 122 and 123. The V-shaped cut 121 shapes the spray discharged from the orifice 120 to a spray having a substantially elliptical transverse section form. The purpose of so forming the spray discharged from this nozzle will be subsequently described.

Seat 111 preferably includes a main body portion 125 having a nipple 126, a flanged portion 127 at one end thereof, and a centrally disposed passageway 128 therethrough. Nipple 126 fits within chamber 119 of tip 110, passageway 128 of seat 111 being axially aligned with orifice 120 of tip 110.

Retainer nut 112 preferably includes a main body portion 130 which has a flange 131 at one end thereof and is provided with threads 132 adjacent the other end thereof.

Nozzle means J is held in assembled relationship by retainer nut 112, as shown in FIG. 7. In such assemblage, flange 131 of retainer nut 112 abuts flange portion 116 of tip 110, which, in turn, abuts flange 127 of seat 111, flange 127 in turn abutting against housing 96. Passageway 128 of seat 111 and orifice 120 of tip 110 are axially aligned with pasasgeway 101 of housing 96, for discharge of material from passageway 101, through passageway 128, and out through orifice 120.

Fluid flow control means K controls the expulsion of fluid through orifice 120 of spray means H. Fluid flow control means K preferably includes a shaft 135 slidably received within and supported by housing 96, shaft 135 extending through passageway 101 and terminating with a blunt tapered end 137 which cooperates with seat 111 in controlling fluid flow which is discharged through orifice 120, as will be subsequently described.

The opposite end of shaft 135 from the blunt end 137 thereof is slidably mounted within support means 39 of main body portion B, as has been previously described. Shaft 135 is urged, such as by spring 138, into engagement with seat 111. A guide member 139 is secured to shaft 135, which guide member 139 is provided for abutment against trigger means D, as will be subsequently described.

It is to be noted that fluid flow control means G of each of the two spray means E and the fluid flow control means K of spray means H are individually adjustable so that the discharge of spray means E may be proportioned with respect to each other and the discharge of spray means H may be proportioned with respect to the discharge of spray means E.

Inasmuch as the fluid, usually the catalyst, which is to be discharged through nozzle means J is extremely thin and non-viscose, a "metal to metal" valve, such as nozzle means F, would not provide a positive, drip-proof, cut-off valve. My improved valve means 97 thus preferably includes a seat 111 which is of some resilient material, neutral as regards the fluid to be ejected therethrough, and has high "rebound" qualities. A material which I have found to be particularly effective is "Teflon" which is a polytetrafluoroethylene resin manufactured and sold by E. I. du Pont de Nemours & Co., Inc.

Ordinarily, a resilient seat of this type would, upon engagement of the metal shaft 135 of fluid control means J, "cold form" or "creep" in an ever increasing diameter whenever the shaft 135 thereof was spring urged to bear against the passageway 128. Under such conditions, the shaft 135 would eventually "jamb" or "wedge" itself into the passageway 128 of the resilient seat, and when the shaft was retracted, such as by trigger means D, the resilient seat 111 would tend to bind onto the shaft and thus the seat would be torn loose from its retaining means. If this loosening of the seat occurs, all control of fluid flow is lost. Even if the resilient seat was somehow mechanically retained in such a manner that when the shaft was retracted the seat would not become loosened from its retaining means, there would still be the problem of the ever increasing diameter of passageway 128, due to the "cold flow" or "creep" caused by the shaft 135, which would, eventually, cause leakage.

I have overcome this problem inherent in the use of resilient seats by using a relatively blunt taper 137 on shaft 135, which blunt taper does not tend to wedge open passageway 128 of seat 111. I have also reinforced the resilient seat 111 by having the nipple 126 thereof seated within the chamber 119 of tip 110. The close proximity of the metal walls of chamber 119, about nipple 126, through which passageway 128 passes, lends sufficient support to the resilient seat 111 to prevent the same from "cold forming" or "creeping" excessively.

As previously specified, spray means H preferably carries the catalyst of the plastic composition which is being spray deposited by the spray gun A. If, by accident, the supply of catalyst should be exhausted, or should a restriction in the supply line suddenly stop or slow down the catalyst flow, the operator thereof is likely, unless some visual means is provided to indicate this condition, to continue to spray up an entire project without realizing that the catalyst flow has either slowed down or been stopped completely. Such an accident would cause a complete and total loss of the sprayed up material, the cost of which could easily be in excess of many thousands of dollars. Thus, it is necessary that the spray gun operator be constantly aware of the catalyst flow. My improved sight flow gauge 105 is provided to advise the operator of the condition of catalyst flow.

My improved sight flow gauge 105 is positioned, as previously disclosed, adjacent spray gun A, intermediate hose 106 and conduit 104, in juxtaposition so that it is always visible to the spray gun operator.

Sight flow gauge means 105 preferably includes an outer shell 145 having a slot 146. The shell 145 supports an inner transparent glass shell 147, fluid flow from hose 106 to conduit 104 passing through shell 147. A float 148 is positioned within shell 147. The float is chemically resistant to fluid which passes through shell 147 and the specific gravity of the fluid flowing through shell 147 and the specific gravity of the float is maintained in equilibrium, so that, under "no flow" conditions, the float is positioned in the center of slot 146 and the flow of fluid through shell 147 causes the float to move downward in direct proportion to the flow rate of the fluid.

Assuming that a catalyst such as methylethyl ketone peroxide is flowing through sight gauge 105, and the float is a polyethylene solid ball, a condition of equilibrium is maintained as follows:

The specific gravity of methylethyl ketone peroxide catalyst is approximately 1.060 while the specific gravity of the medium density polyethylene ball is 0.925. Thus, the polyethylene ball will float to the top of the sight gauge in defiance of the downward flow direction of the MEK catalyst, when the catalyst flow is slow, which it usually is, due to the low amount of volume of catalyst which is required. Thus, in order to very delicately center the polyethylene float in the center of the slot 146, so that even the slightest flow of catalyst will cause the float to move downward in direct proportion to the flow rate of the catalyst, I found it necessary to very delicately lower the specific gravity of the MEK catalyst. This was accomplished by adding a compatible diluting liquid that had a lower specific gravity than the MEK catalyst, and by properly proportioning the diluents and the catalyst so that the polyethylene ball will float at a specific depth in the sight flow gauge, the specific depth being dead center longitudinally of the slot 146 when there is no flow of the catalyst. The fact that there is such a delicate balance of specific gravity, makes it possible to view the movement of the polyethylene float and tell by its movement not only that the catalyst is flowing, but also at what rate of flow the catalyst is moving. This is visually noted by ascertaining the depth that the ball is being forced down away from its normal center position. Ethyl acetate may be used as the diluting liquid.

Trigger means D preferably includes an elongated trigger 150 which is pivotally secured to the main body portion B, such as by pivot stud 151. Trigger 150 has secured thereto a plate 152 in juxtaposition for abutment against guide member 139 of fluid flow control means K and an elongated plate 153 which extends outwardly from trigger 150 into abutment with guide washers 95 of the outboard spray means E of each side barrel portion 22 and 23. Plate 152 is likewise positioned on trigger 150 for abutment against shaft 51 of valve means C. Spring 53 of valve means C urges the trigger means D into a position out of abutment with guide member 139 and the guide washers 95, finger pressure of the operator compressing the trigger means into operative abutment with guide member 139 and guide washers 95.

Trigger means D thus provides means for the simultaneous actuation of valve means C, spray means E, and spray means H.

Cutter means L is used when it is desired to spray deposit a plastic reinforced with cut roving. The cutter means L is therefore an optional piece of equipment, and does not form an integral part of this invention. However, inasmuch as the spray guns which are manufactured and sold according to this invention will mainly include cutter means L, I have illustrated the same. When the cutter means L is included on the spray gun, the operator may optionally use the gun either with or without use of cutter means L.

Cutter means L may be identical to the cutter means which is illustrated in my copending application Ser. No. 134,650, filed Aug. 29, 1961.

Such cutter means L preferably includes a housing 160, attaching means 161, and feeding and cutting means 162.

In this type of cutter means, the attaching means 161 provides for movable mounting of the housing 160 upon the spray gun A so that the opening 163, through which the cut roving is ejected, may be angularly varied with respect to the sprays issuing from spray means E and spray means H. This provides for centering the cut roving in the spray streams so that the roving will be "pre-wet" and will not ride on top of or fall through the spray stream.

Feeding and cutting means 162 is positioned to receive roving strand 165 from guide tubes 166, and to cut the continuous strands into short filaments, which are then ejected through mouth 163 into the spray streams of spray means E and H, as shown in FIG. 12.

Feeding and cutting means 162 is preferably driven by an air motor 168 which is attached to hose 45 leading from main body portion 20. Air motor 168 is provided with a control 169 so that cutter means L may be rendered inoperative when the spray gun A is otherwise in full operation.

Modified spray gun O is substantially identical to spray gun A, and identical reference numerals, with a prime character added have been applied to the parts of spray gun O which correspond to the same parts of spray gun A.

The main distinction between spray gun O and spray gun A is that the nozzle means Q of outboard spray means P of spray gun O are of the "airless" types, as will be subsequently described.

Since nozzle means Q is of the "airless" type, the same need not be in communication with an air supply such as provided from chamber 63 of the side barrel portions 22 and 23 of spray gun A. The side barrel portions 22' and 23' of spray gun O may thus be substantially solid.

Trigger means D', central spray means H', and cutter means L' of the modified spray gun O are identical to those of spray gun A.

Fluid flow control means R of spray gun O are identical to fluid flow control means G of spray gun A.

As previously specified, each nozzle means Q is of the "airless" type, preferably including a housing 170 and nozzle valve means 171.

Housing 170 preferably includes an upper flanged portion 172 which is secured, such as by screw member 173 to its respective side barrel portion 22' or 23'.

Housing 170 includes a passageway 174 leading to nozzle valve means 171 and a conduit portion 175 having a passageway 176 which opens at one end thereof into passageway 174. Conduit 175 is attached, at the end thereof opposite its opening into passageway 174, with a conduit 177 which is attached to a manifold 178.

Manifold 178 intercommunicates with each of the outboard spray means P, and is provided with an intake conduit 180 to which hose 81' may be attached such as by a quick disconnect coupling 182. In this form of the invention, hose 79' is shown as having a quick disconnect coupling 183 so that hose 79' may be interconnected with coupling 180, when hose 81' is removed therefrom. As previously noted, the particular manifold interconnection does not form any predominant part of my invention, and it is obivous that either the quick disconnect coupling as shown on spray gun O or the valve type manifold of spray gun A, or any other suitable form of manifold interconnection may be used.

Nozzle valve means 171 preferably includes a tip 190, seat 191, and retainer nut 192.

Tip 190 preferably has a V-shaped cut 195 in its discharge end, and includes a discharge orifice portion 196, and has a flange portion 197 at the end thereof opposite the discharge end.

Seat 191 has a passageway 198 therethrough and is provided with a flange portion 199 at one end thereof.

Retainer nut 192 clamps seat 191 in an interfitting position within chamber 174 of housing 170 and clamps tip 190 to housing 170, with the discharge orifice portion 196 of tip 190 in axial alignment with passageway 198 of seat 191. A washer 200 may be provided between tip 190 and seat 191, to prevent leakage of fluids.

Fluid flow control means R controls the expulsion of fluid through discharge orifice 196 of spray means Q. This is accomplished by shaft 92', which has a tapered end 93' which interfits within passageway 198 of seat 191, in a sealing relationship. When needle-like tip 93' of shaft 92' is withdrawn from passageway 198, by actuation of trigger means D', fluid will be discharged through orifice 196.

In spray gun O, I have shown hose 106' leading directly to conduit 104' without sight gauge means 105 being disposed therebetween. This is illustrative that my improved spray gun may be used either with or without sight gauge means 105.

As previously set forth, the apparatus of the present invention is primarily provided for the spray depositing of plastics which require a chemical reaction between three or more chemical components. There are a number of such plural component plastics resins presently available on the market, however, rather than to briefly describe use of the apparatus in connection with a number of them, attention will be directed to one specific plastic, in great detail. The plastic chosen for description will be those of the polyester resin group. It is, of course, obvious that the apparatus and method herein shown and described may be used in connection with the spray depositing of numerous other plural component plastics.

In connection with the use of polyester resins, two basic eleemnts are necessary to provide for the curing and hardening of the polyester resin. These elements are:

(1) A promoter, such as diethylaniline, dimethylaniline, or cobalt naphthenate.

(2) A catalyst, such as benzoyl peroxide, or methylethyl ketone peroxide.

The present art teaches the mixing of the promoter with a polyester resin, in one "pot" and the mixing of a catalyst and a polyester resin in another "pot."

Spray guns which have previously been provided for the spray depositing of such polyester resins, have included only two spray heads, a spray mixture of promoter and polyester resin being sprayed through one of the heads, and the intermixture of catalyst and polyester resin being delivered through the other spray head. A spray gun of this type is illustrated in my copending application Ser. No. 134,650, filed Aug. 29, 1961. In such arrangement, the catalyzed and promoted resins are ejected through separate nozzles of the gun, the sprays being united and intermixed at a point outwardly of the spray gun.

Previous spray techniques usually comprised the mixture of a diethylaniline or dimethylaniline promoter in a previously uncatalyzed and unpromoted polyester resin in a ratio of 1 to 4 parts promoter to 100 parts of polyester resin. As previously set forth, this mixture is placed into a fluid container and supplied to one of the two spray heads of the spray gun. In the trade, the spray head to which this mixture is supplied is referred to as the "promoted" side of the spray system. The problem of this method of promoting a polyester resin is that dimethylaniline and diethylaniline will both cause the polyester resin to cure or harden in the "pot" in about 3 to 7 days. This hardening or curing occurs because of the chemical reaction between the aniline promoter and the polyester. This chemical reaction occurs even though no catalyst has been added.

The other spray head of such two headed spray gun will usually carry a benzoyl peroxide catalyst which has been intermixed with a previously uncatalyzed and unpromoted polyester resin in a ratio of 1 to 4 parts catalyst to 100 parts polyester resin. This mixture is placed in a separate and isolated "pot" from the previously described promoted resin, and the spray head of the gun to which this mixture is supplied is referred to in the trade as the "catalyst side" of the spray gun. The problem with this means of catalyzing a polyester resin is that benzoyl peroxide catalyst will cause the polyester resin to cure or harden in the "pot" in about 2 to 5 days. This is due to the chemical reaction which occurs between the benzoyl peroxide catalyst and the polyester resin after they have been mixed. This chemical reaction occurs even though no promoter has been added.

In the event that cobalt naphthenate is used as a promoter, in the previously known spray techniques above described, the intermixture of cobalt naphthenate and polyester resin will not cure, or react chemically in the "pot" for a period of approximately 6 months. Therefore, it would seem to be the better practice to use cobalt naphthenate as a promoter, rather than either dimethylaniline or diethylaniline. The only problem with this procedure is that the cobalt promoted polyester resin is not chemically reactive with benozyl peroxide catalyzed polyester resin. Thus, if the cobalt promoted resin was ejected from one of the spray nozzles of a gun such as that illustrated in my aforementioned copending application Ser. No. 134,650, and benzoyl peroxide catalyzed polyester resin ejected from the other spray head of such spray gun, the two sprays being united and intermixed in an atomized spray, as taught by the aforementioned application Ser. No. 134,650, the resulting admixture would not cure or harden for several weeks. This is, of course, very undesirable, inasmuch as optimum spray techniques require the curing or hardening of the resin in about 45 minutes. The reason that the benzoyl peroxide catalyzed polyester resin would harden in the fluid container in 2 to 5 days, but not on the sprayed up mold for several weeks is due to the fact that the mixture in the fluid container would have a much larger "bulk" factor of resin and benzoyl peroxide.

Since benzoyl peroxide catalyzed polyester resin will not chemically react with cobalt promoted polyester resin, it would seem logical to provide the "catalyst side" of the dual headed spray gun with a methylethyl ketone peroxide catalyzed polyester resin. Methylethyl ketone peroxide catalyzed polyester resin will react with cobalt promoted polyester resin within 45 minutes after this combination of cobalt promoted polyester resin and methylethyl ketone peroxide catalyzed polyester resin had been spray deposited by a gun such as that disclosed in my aforementioned application Ser. No. 134,650. The problem with this procedure is that methylethyl ketone peroxide catalyzed polyester resin will harden or cure in the "pot" within 1 to 10 hours. This is true even though no promoter is added to this catalyzed resin mixture.

It is therefore obvious that the problem of spray depositing plural component plastic resins is serious. It is likewise obvious that this problem cannot be overcome when only dual head spray guns are used. For instance, in conventional spray techniques, the spray gun is intermittently operated, some jobs taking longer than 1, 2, or 3 days to complete, and it is obvious that the users of this type of spray system are faced with the problem of the resin hardening or curing in the fluid containers. If this occurs, the solidified resin cannot be easily removed from the container, and it is obvious that much time will be lost in the event that the fluid supply containers have to be cleaned out after each day's operation.

As above noted, my observations have led me to conclude that the addition of a cobalt promoter, such cobalt naphthenate, to an uncatalyzed polyester resin does not have any appreciable effect on the "pot life" of the polyester resin.

I have further observed that an intermixture of catalyst with polyester resin cures or hardens in a relatively short time, so that optimum performance in spray techniques can be attained only by keeping the catalyst separate from the polyester resin until the same is discharged from the spray gun.

It may be proposed that a dual head spray gun, such as that disclosed in the aforementioned application Ser. No. 134,650 could be used, one of the spray heads thereof dispensing a promoted resin, and the other merely a catalyst. The problem in this procedure is that the promoted polyester resin is relatively viscous, usually thixotropic, while the catalyst is "water thin." Since the viscosity of these two fluids is so different, atomized intermixing of the sprays is exceeding difficult.

Another problem with attempting to dispense a catalyst out of one nozzle of a dual head spray gun, and a promoted resin out of the other nozzle, is that the promoted resin nozzle would be dispensing approximately 99⅝ parts liquid while the catalyst nozzle would only be dispensing ⅜ of one part of liquid. Obviously this imbalance would cause the spray stream of promoted resin to be relatively straight while the catalyst stream would be turned in the direction of the spray issuing from the "promoted side" of the spray gun. Thus, the converging spray streams would not spray straight ahead, as desired, but would instead spray off to one side.

My invention contemplates apparatus and methods of spray depositing plural component plastic resins by the blending of a mixture of plastic resin and promoter with a catalyst by the projection of a spray of catalyst and a spray of the mixture of plastic resin and promoter. Using the polyester resin example above noted, optimum results with my method would include the blending of a mixture of polyester resin and cobalt naphthenate promoter with methylethyl ketone catalyst by the projection of a spray of methylethyl ketone catalyst at a spray of cobalt promoted polyester resin.

The method and operation of the apparatus of my invention is as follows:

Either spray gun A or O may be used, as desired, spray gun A being used in this illustration. Spray gun O would operate in much the same manner, as is obvious.

A fluid container or "pot" is filled with a promoted resin, for instance, an intermixture of polyester resin and cobalt naphthenate, and a separate fluid container, or "pot," is filled with catalyst, for instance, a methylethyl ketone peroxide catalyst. Hose 81 is attached to the container containing the promoted resin, and hose 106 is connected to the container containing the catalyst. An air pressure supply is attached to the containers to pressurize them, such as by attachment to a compressed air cylinder, and an air pressure supply is attached to hose 35.

In the event that cut roving is to be spray deposited together with the plastic, roving may be fed through hoses 166 to cutter means L. The cutter means L will then be adjusted to the desired angle with respect to the spray streams, the mold or article to be treated is set up, the gun aimed, and the trigger means depressed.

Depression of trigger means D actuates valve means C, for the furnishing of air under pressure to air motor 168, and, if it is not desired to use cutter means L, control 169 of air gun 168 is operated, which renders air motor 168 inoperative.

Depression of trigger means D will simultaneously actuate spray means E, and spray means H of spray gun A, or spray means P and spray means H' of spray gun O, depending which form of spray gun is being utilized.

As shown in subsection A of FIG. 12, the spray stream issuing from nozzles F will be of substantially circular transverse cross section when they are ejected from the gun, and before the two spray streams of spray means E intersect. As shown in subsection B of FIG. 12, the spray streams issuing from nozzles E, after they intersect, form a spray pattern of elliptical transverse cross section. The collision of the "cross fire" circular streams from spray means E causes the resultant intermixed homogeneous spray to assume this elliptical pattern.

As previously described, nozzle means J, which will carry the catalyst, ejects a spray pattern of catalyst in an elliptical shape as shown in subsection A of FIG. 12. The elliptical pattern of catalyst spray will intersect with the promoted resin sprays from spray means E about 6 inches from the spray gun. This spray ejection into a "cross fire" of promoted resin sprays, adjacent the locus of intersection of the sprays from outboard spray means E, traps the catalyst in the "cross fire" of the promoted resin streams, thus assuring a near perfect intermixture of catalyst with the promoted resin streams.

In the case of the spray gun O, the nozzles Q thereof emit an elliptical spray pattern of promoted resin, the same being preferably angled with respect to each other, substantially as shown in subsection C of FIG. 12, and the end result is the same, namely, an ultimate spray pattern substantially as shown in subsection B of FIG. 12.

In the event that cutter means L is used in connection with the spray gun, the same is angled to discharge cut roving into the spray streams at approximately 4 inches from the gun.

It is to be specifically noted that, since the promoted resin is discharged from the gun through a separate nozzle from that which discharges the catalyst, that the catalyst to resin ratio may be varied merely by variation in the restricted outlet portion, or discharge orifice, of the various nozzle means. In other words, I can increase discharge of promoted resin by providing a nozzle means having an enlarged discharge orifice on the spray means ejecting the same; I may decrease the discharge of promoted resin by providing a nozzle means having a more restricted discharge orifice on the spray means discharging the same; I may increase the discharge of catalyst by providing a nozzle means having an enlarged discharge orifice on the spray means discharging the same; or I may decrease the discharge of catalyst by providing a discharge orifice of decreased diameter on the spray means handling discharge of the same. Changes in the catalyst to resin ratio will most usually be accomplished by changing the nozzle of the catalyst spray means. This is a very important feature, inasmuch as it makes it possible to obtain faster or slower curing rates simply by using a nozzle means having a discharge orifice of the desired diameter, without changing or altering the pressure on the catalyst or promoted resin, or without changing the chemical formula of the catalyst or promoted resin components. It only takes a matter of seconds to change the nozzle of the catalyst spray means. In previous apparatus, changing the catalyst to resin ratio consumed a great deal of time, in some cases several hours, and in other cases this was impossible without completely changing the resin formula. Inasmuch as it is sometimes desirable to change the curing rate of a spray-up laminate several times during an hour's work, my improved apparatus enables the same to be made with facility, which was impossible with previously provided systems and apparatus.

It is thus obvious that my apparatus provides for spray techniques in which the direction of the spray pattern can be accurately determined, and the gun can be used intermittently, without fear of the plastic hardening or curing in the fluid containers which supply resin to the gun, during any given job.

Various changes in the shape, size and arrangement of parts and various changes in the method of the forms of invention herein shown and described may be made without departing from the spirit of the invention or the scope of the following claims.

I claim:

1. The method of forming a plastic article including the steps of blending a mixture of plastic resin and promoter with a catalyst by projecting a pair of sprays of the mixture of plastic resin and promoter into one another from spaced apart terminal locations, projecting a spray of the catalyst into the sprays of the mixture of plastic resin and promoter, and directing the intermixed sprays in a predetermined direction.

2. The method of forming a plastic article including the steps of blending a mixture of plastic resin and promoter with a catalyst by projecting a pair of sprays of the mixture of plastic resin and promoter into one another in spaced apart terminal locations positioned in a given plane, projecting a spray of the catalyst into the sprays of the mixture of polyester resin and promoter from a terminal location positioned intermediate and in the same plane as the terminal location of the sprays of the mixture of plastic resin and promoter, and directing the intermixed sprays in a predetermined direction.

3. The method of forming a plastic article including the steps of blending a mixture of plastic resin and promoter with a catalyst by projecting a pair of sprays of the mixture of plastic resin and promoter into one another from spaced apart terminal locations, projecting a spray of the catalyst into the sprays of the mixture of polyester resin and promoter from a terminal location with the spray of the catalyst intersecting the sprays of the mixture of plastic resin and promoter at the locus of intersection of the sprays of the mixture of plastic resin and promoter, and directing the intermixed sprays in a predetermined direction.

References Cited

UNITED STATES PATENTS

| | | | |
|---|---|---|---|
| 2,820,671 | 1/1968 | McFarland | 239—10 |
| 2,919,070 | 12/1959 | Arant | 239—10 |
| 2,945,632 | 7/1960 | Ball | 239—583 |
| 2,957,631 | 10/1960 | Armstrong | 239—584 |
| 3,033,472 | 5/1962 | Shelton | 239—336 |
| 3,121,639 | 2/1964 | Bauer et al. | 239—422 |
| 3,130,913 | 4/1964 | Shelton | 239—336 |
| 3,147,619 | 9/1964 | Whitacre | 73—209 |
| 3,096,225 | 7/1963 | Carr et al. | 239—336 |
| 3,135,467 | 6/1964 | Greenman | 239—304 |
| 3,162,370 | 12/1964 | Moonan et al. | 239—304 |
| 2,945,632 | 7/1960 | Ball | 239—583 |
| 3,166,251 | 1/1965 | Stitt et al. | 239—583 |
| 3,154,945 | 11/1964 | Busillo | 73—209 |

FOREIGN PATENTS 520,932   5/1940   Great Britain.

OTHER REFERENCES

Glass Reinforced Plastics by Phillip Morgan, pages 41 to 48.

EVERETT W. KIRBY, *Primary Examiner.*

M. HENSON WOOD, JR., *Examiner.*

R. S. STROBEL, *Assistant Examiner.*